United States Patent [19]

Yoo et al.

[11] Patent Number: 5,680,771
[45] Date of Patent: Oct. 28, 1997

[54] REFRIGERATOR HAVING AN ICE CRUSH APPARATUS

[75] Inventors: Yeon-Sic Yoo; Mee-Ran Seo, both of Seoul, Rep. of Korea

[73] Assignee: Daewoo Electronics Co., Ltd., Seoul, Rep. of Korea

[21] Appl. No.: 724,236

[22] Filed: Sep. 27, 1996

[30] Foreign Application Priority Data

Sep. 29, 1995 [KR] Rep. of Korea ............... 95-32695

[51] Int. Cl.$^6$ ............................................. F25C 5/12
[52] U.S. Cl. ..................................... 62/320; 241/DIG. 17
[58] Field of Search ........................ 62/320; 241/DIG. 17

[56] References Cited

U.S. PATENT DOCUMENTS

| | | | |
|---|---|---|---|
| 2,627,377 | 2/1953 | Fletcher | 241/DIG. 17 |
| 4,547,076 | 10/1985 | Maurer | 241/DIG. 17 |
| 4,569,266 | 2/1986 | Ando | 241/DIG. 17 |
| 4,745,773 | 5/1988 | Ando | 241/DIG. 17 |
| 5,007,591 | 4/1991 | Daniels, Jr. | 241/DIG. 17 |
| 5,513,810 | 5/1996 | Lin | 241/DIG. 17 |

Primary Examiner—William E. Tapolcai
Attorney, Agent, or Firm—Beveridge, DeGrandi, Weilacher & Young LLP

[57] ABSTRACT

A refrigerator having an ice crush apparatus enables to conveniently prepare food such as shaved ice with sugar syrup includes a motor and a section formed by plural links for transferring the motor in the axial direction. A clutch is installed between the motor and a freezing container which is formed with a clutch disc onto the bottom plane, and a rotating rod and brackets are installed for reversing the freezing container. A cutter is fixed to face the lower portion of the reversed to be rotated freezing container for crushing the ice within the freezing container. That is, the ice is crushed by the cutter while the freezing container is reversely rotated and transferred downward to be the food such as shaved ice with sugar syrup. Thus, the water is frozen to be crushed for preparing the shaved ice with sugar syrup simply and conveniently within the household refrigerator. Also, the shaved ice with sugar syrup can be prepared without taking out or relocating the ice to have an effect for sanitary reason.

22 Claims, 9 Drawing Sheets

REFRIGERATOR HAVING AN ICE CRUSH APPARATUS

BACKGROUND OF THE INVENTION

1. Field of the Invention

The present invention relates to an apparatus for shaving ice, and more particularly to an ice crush apparatus installed to the interior of a freezing chamber of a refrigerator.

2. Description of the prior Art

A general household refrigerator is provided with a space for simply freezing water within the interior of a freezing chamber thereof, but has no apparatus capable of crushing frozen water into small pieces. Therefore, when food such as shaved ice with sugar syrup is intended to be directly prepared, water is frozen to produce a lump of ice. Then, the ice is taken out of the freezing chamber to be crushed into small pieces by using a separate ice crusher or ice freezer.

Consequently, it has a drawback of being troublesome since the ice should be put out from a freezing container and is then set to the separate ice crusher.

SUMMARY OF THE INVENTION

Therefore, the present invention is devised to solve the foregoing problems. It is an object of the present invention to provide a refrigerator having an ice crush apparatus, wherein the ice crush apparatus is directly installed into a freezing chamber of the refrigerator to enable to conveniently prepare food using shaved ice at home.

To achieve the above object of the present invention, there is provided a refrigerator having an ice crush apparatus including a motor for producing a rotating force, and a transfer section for transferring the motor in the axial direction. A first clutch disc is connected to a driving shaft of the motor, and a freezing container is formed with a second clutch disc closely attached to the first clutch disc onto a bottom plane thereof. The freezing container is reversed by a container reverser section for supporting the rotating motion of the freezing container in the axial line direction, and ice within the reversed freezing container is crushed by an ice crush section.

Preferably, the driving shaft of the motor is installed perpendicularly downward.

Here, it is preferable that the transfer section includes a first link fixed to an upper plane of the motor, a second link having one end connected to the first link, a third link having one end connected to the other end of the second link and the other end connected to a first wall, a fourth link having one end connected to a connecting portion of the second link and third link, and a fifth link which has one end connected to the other end of the fourth link, a center portion connected to the first wall, and the other end forming a free end. Here, the first to fifth links further has an elastic member of which one end is fixed to the fixing wall and the other end is connected to at least one link among the first to fifth links. More preferably, the elastic member is a first spring having one end connected to the first wall and the other end connected to the fifth link.

Preferably, the first clutch disc is formed with first projections onto an opposite plane of the plane connected with the driving shaft, and the first projections may be formed to number three. At this time, the first projections are formed to be long in the radius direction and are regularly spaced from one another in the circumferential direction.

Additionally, it is preferable that the second clutch disc of the freezing container is formed with second projections which may be formed to number three and to be long in the radius direction at the regular interval in the circumferential direction.

Preferably, the container reverser section includes a disc formed with a container mounting hole in the center thereof for being inserted with the freezing container, and a rotating rod having both ends fixed into the opposite radius direction to each other at the outer periphery of the disc for reversing the disc. Also, the rotating motion and perpendicular transferring of the rotating rod is supported by a supporting section.

Here, the disc further has a hot wire internally, and hooks formed around the container mounting hole of the disc for fixing the freezing container. The hooks preferably number three at the regular interval around the container mounting hole.

The rotating rod has a characteristic that one end thereof is bent.

Furthermore, the supporting section includes at least one pair of brackets which receive the rotating rod pierced therethrough and are formed with a spring slit of a predetermined length in the perpendicular direction. The spring slit has a journal installed to the interior thereof for supporting the rotating rod, and a second spring therein for elastically supporting the journal. Also, a guide part guides the perpendicular transferring of the rotating rod.

Here, a weight balancer may be installed onto the other end of the rotating rod for facilitating the reversing motion of the freezing container.

More preferably, the guide part includes a guide projection formed to the rotation center portion of the weight balancer, and a third spring installed into the interior of the weight balancer for elastically supporting the guide projection toward outside. A second wall is inserted with a portion of the guide projection and is formed with a guide groove having a predetermined length in the perpendicular direction. A fourth spring installed around the rotating rod which passes a portion between the bracket and weight balancer elastically and closely attaches the weight balancer to the second wall.

In addition, the ice crush section preferably includes a cutter formed toward the interior of the reversed freezing container, and a center shaft installed to the lower portion of the cutter for fixing the cutter. The center shaft is supported by an exit disc by means of at least one arm, in which the exit disc is formed with a male screw along the outer periphery thereof. Additionally, a support plate has a female screw coupled with the male screw.

At this time, the arm of the exit disc preferably numbers three.

Alternatively, to achieve the above object of the present invention, a refrigerator having an ice crush apparatus includes a motor installed with a driving shaft perpendicularly downward for producing a rotating force. A first link is fixed to an upper plane of the motor, and a second link has one end connected to the first link and the other end connected to one end of a third link of which the other end is connected to a first wall. A fourth link has one end connected to a connecting portion of the second link and third link, and the other end connected with one end of a fifth link of which center portion is connected to the first wall and the other end forms a free end. A first spring has one end connected to the first wall and the other end connected to the fifth link, and a first clutch disc has a plane connected to the driving shaft and an opposite plane installed with first projections numbering three which are formed to be long in the radius direction at the regular interval in the circumferential direction. A freezing container has a bottom plane formed with a second clutch disc closely attached to the first clutch disc onto thereof, in which the second clutch disc is provided with projections that number three and are formed to be long in the radius direction at the regular interval in the circumferential direction. A disc formed with a container mounting hole in the center thereof is inserted with the freezing container and a hot wire therein, and hooks numbering three are furnished thereto for fixing the freezing container around the container mounting hole at the regular interval. A rotating rod has both ends fixed into the opposite radius direction to each other at the outer periphery of the disc for reversing the disc, in which one end is bent and the other end is installed with a weight balancer. A pair of brackets receives the rotating rod pierced therethrough and are formed with a spring slit of a predetermined length in the perpendicular direction. The spring slit is installed with a journal therein for supporting the rotating rod, and a second spring therein for elastically supporting the journal. Then, a guide projection is formed to the rotation center portion of the weight balancer, and a third spring is installed into the interior of the weight balancer for elastically supporting the guide projection toward outside. A second wall is inserted with a portion of the guide projection and is formed with a guide groove having a predetermined length in the perpendicular direction. Also, a fourth spring installed around the rotating rod which passes a portion between the bracket and weight balancer elastically and closely attaches the weight balancer to the second wall. A cutter is formed toward the interior of the reversed freezing container, and a center shaft is installed to the lower portion of the cutter for fixing the cutter. The center shaft is supported by an exit disc by means of three arms and the exit disc is formed with a male screw along the outer periphery thereof. Then, a support plate is formed with a female screw to be coupled with the male screw.

In the refrigerator having the ice crush apparatus according to the present invention constructed as above, the water is poured into the freezing container which is then inserted into the container mounting hole of the disc as it is to be frozen to prepare the ice. Thereafter, when the ice is crushed to prepare shaved ice with sugar syrup, the rotating rod is reversed to reversely rotate the freezing container altogether. At this time, the bent rotating rod is rotated to operate the hot wire switch. By doing so, the hot wire of the disc is connected with a power supply source to produce heat, and the generated heat is transmitted to the freezing container to melt the ice between the container mounting hole and freezing container.

A user swings the fifth link while operating the operating switch. Then, the rotating force is transferred to the freezing container via the clutch, and the ice is crushed by the cutter. The shaved ice is dropped down to be retained within the ice bowl via the ice discharging hole.

By the refrigerator having the ice crush apparatus described as above, the water is directly frozen at home to easily prepare the food such as shaved ice with sugar syrup. Also, the food such as shaved ice with sugar syrup can be prepared immediately from the freezing container without involving inconvenience caused heretofore by relocating the ice.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A refrigerator having an ice crash apparatus according to the present invention will be described in detail with reference to an embodiment illustrated in the accompanying drawings.

Figure 1:
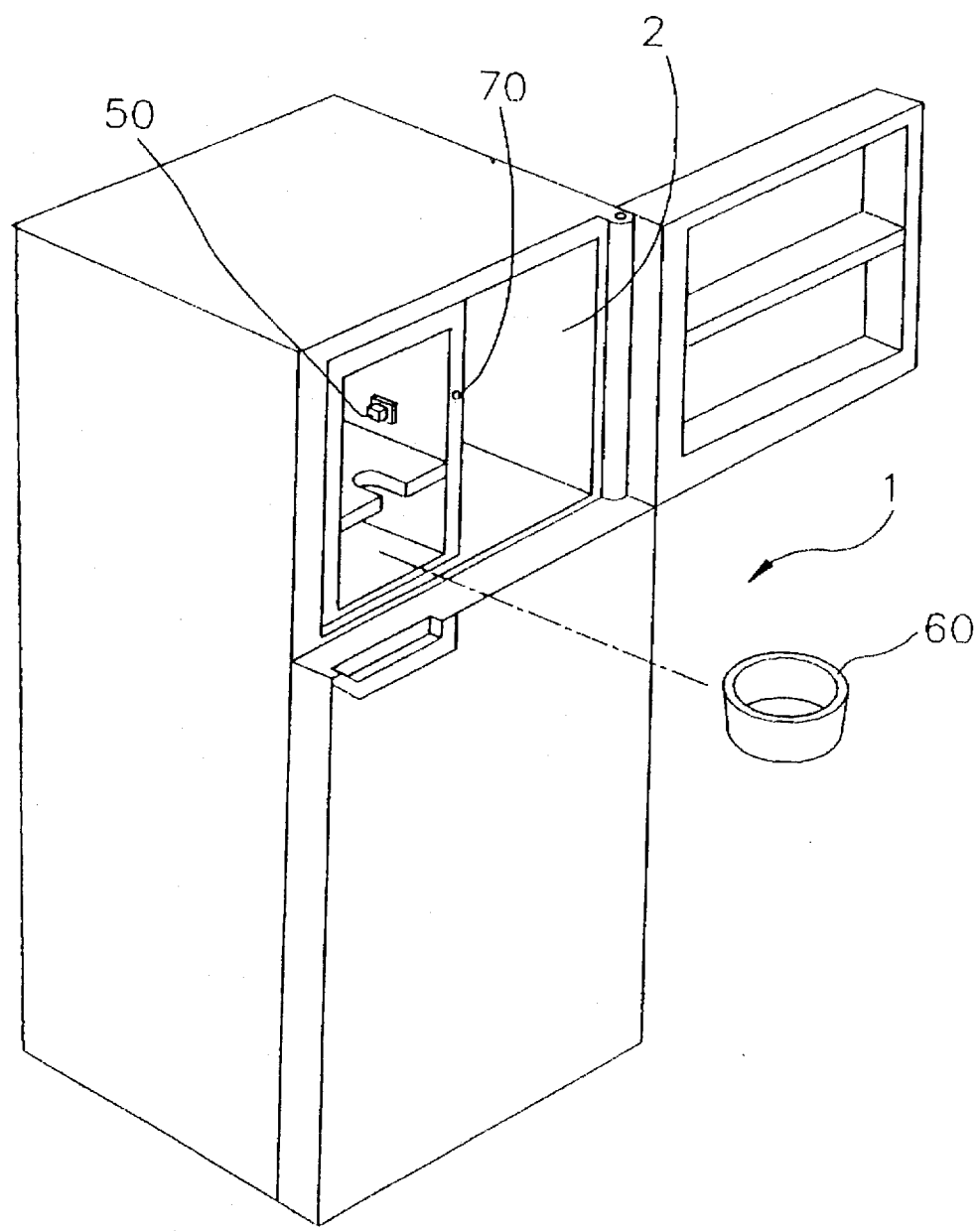
FIG. 1 is a perspective view showing a state that a door of a freezing chamber of a refrigerator having an ice crush apparatus according to the present invention is opened.

FIG. 1 is a perspective view showing a state that a door of a freezing chamber of a refrigerator having an ice crush apparatus according to the present invention is opened. As shown in FIG. 1, freezing chamber 2 is furnished to the upper portion of refrigerator 1, and an operating switch 70 is installed to the outer side of a partitioned wall within freezing chamber 2, and a hot wire switch 50 is installed to the inner side of the partitioned wall. An ice bowl 60 for containing the shaved ice is placed onto the bottom surface of a partitioned space.

Figure 2:
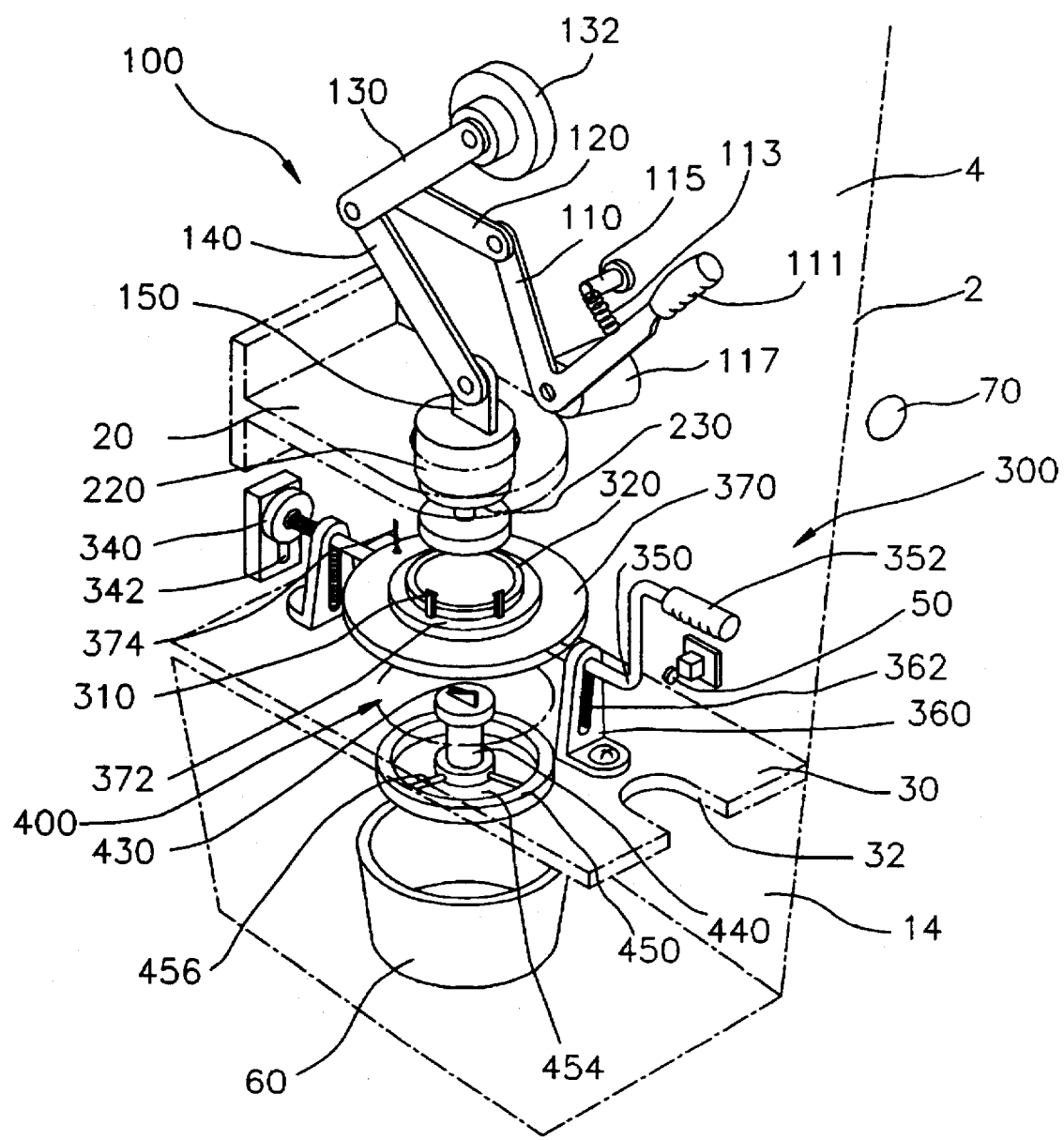
FIG. 2 is a perspective view showing the ice crush apparatus installed to the interior of the freezing chamber of the refrigerator having the ice crush apparatus according to the present invention.
Figure 3:
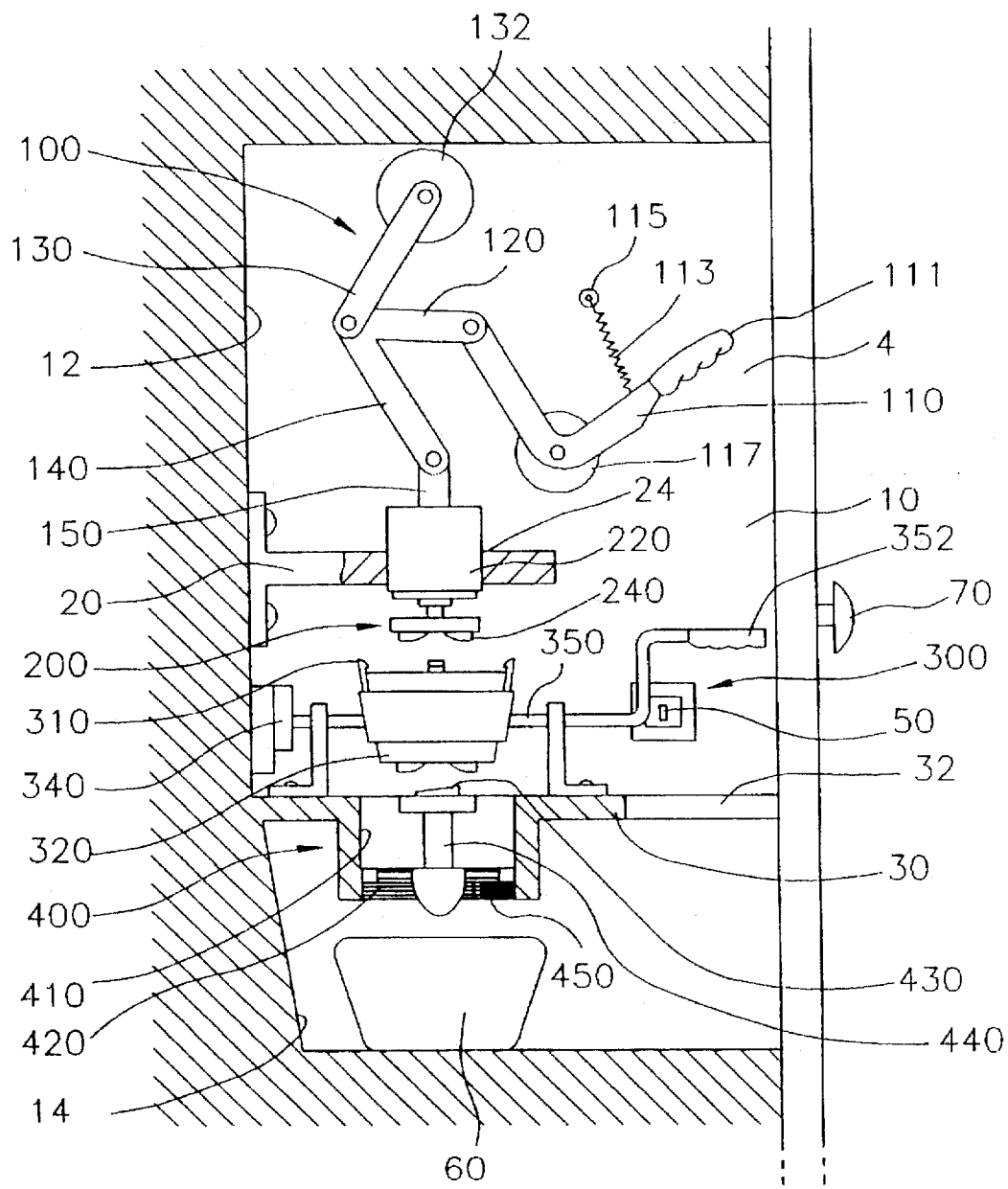
FIG. 3 is a side view of the ice crush apparatus shown in FIG. 2.

FIG. 2 is a perspective view showing the ice crush apparatus installed to the interior of the freezing chamber of the refrigerator having the ice crush apparatus according to the present invention, and FIG. 3 is a side view of the ice crush apparatus shown in FIG. 2. As shown in FIGS. 2 and 3, the interior of freezing chamber 2 is divided into an upper storage space 12 and a lower storage space 14, and a support plate 30 is disposed between them.

Upper storage space 12 is installed with a transfer section 100, a clutch 200 and a container reverser section 300, and lower storage space 14 is installed with an ice crush section 400 and ice bowl 60.

Transfer section 100 consists of five links. That is, one end of a first link 150 is fixed to an upper plane of a motor 220, and the other end thereof is connected to be rotatable to one end of a second link 140. One end of second link 140 is connected to the other end of first link 150, and the other end thereof is connected to be rotatable to one end of a third link 130. One end of third link 130 is connected to the other end of second link 140, and the other end is connected to one side of a second spacer 132. Here, second spacer 132 for sustaining a distance between the wall plane and the link has one side connected to the other end of third link 130 and the other side fixed to a first wall 4.

One end of fourth link 120 is also connected to the point of connecting second link 140 and third link 130, and the other end thereof is connected to one end of fifth link 110. At this time, fifth link 110 shaped as an alphabet V has one end connected to the other end of fourth link 120, the center portion fixed to first wall 4 via a first spacer 117, and the other end formed with a first handle 111.

One end of a first spring 113 is connected to a spring fixing end 115 fixed to first wall 4, and the other end thereof is connected to the first handle area in fifth link 110.

A guide plate 20 is fixedly supported by a second wall 6, and is formed with a guide hole 24 piercing through the central portion thereof.

Motor 220 is inserted into the interior of guide hole 24 to be slidable therein, and a driving shaft 230 is installed to face perpendicularly downward. Clutch 200 is installed to the end of driving shaft 230. The driving of motor 220 is performed by operating switch 70 installed to the outer side of first wall 4.

Container reverser section 300 is installed between guide plate 20 and support plate 30.

A pair of brackets 360 are fixed onto the upper plane of support plate 30 to oppose to each other, and a rotating rod 350 penetrates through brackets 360. A free end of rotating rod 350 is bent twice to provide a second handle 352, and the other end thereof is installed with a weight balancer 340.

A freezing container 320 is formed with second projections 324 on the lower plane thereof, and is fixed by means of three hooks 310. Second projections 324 are to be meshed with first projections 240 formed onto clutch 200.

Hot wire switch 50 is installed onto first wall 4 at the second handle area for being opened/closed by the rotation of second handle 352.

Ice crush section 400 is installed to a thruhole 410 formed in support plate 30. Here, support plate 30 is formed with thruhole 410 having a female screw 420 furnished along the central portion, and a plate hole 32 is formed in the support plate 30 for the second handle 352.

A cutter 430 has a slanted edge to face perpendicularly upward, and is fixedly supported by a center shaft 440.

Center shaft 440 is arranged in the axial line direction within thruhole 410, is fixed with cutter 430 onto the upper plane thereof, and is supported by an exit disc 450 by three arms 456 formed onto the lower end thereof in the radius direction.

Exit disc 450 is formed with an ice discharging hole 454 in the midst of arms 456, and a male screw 460 is formed along the outer periphery thereof for being coupled with female screw 420. Additionally, ice bowl 60 for retaining the shaved ice is placed onto the lower side of ice discharging hole 454.

Figure 4:
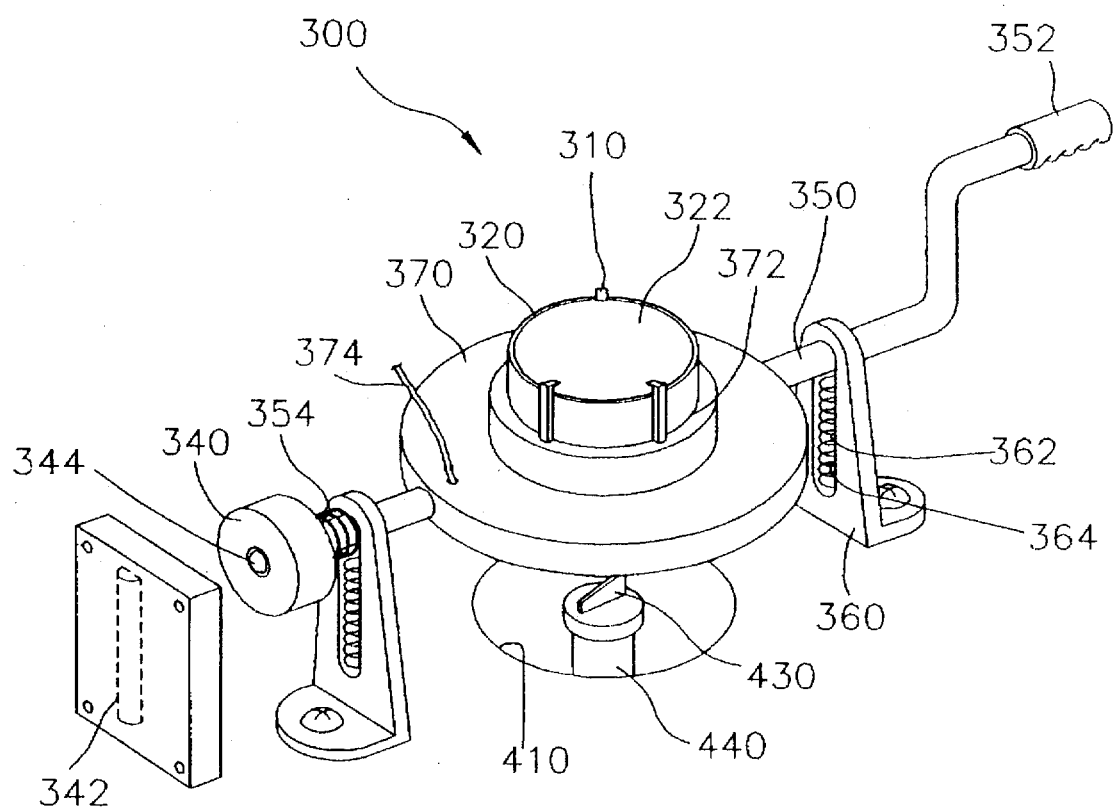
FIG. 4 is a perspective view showing an embodiment of the container reverser section of FIG. 2.
Figure 5:
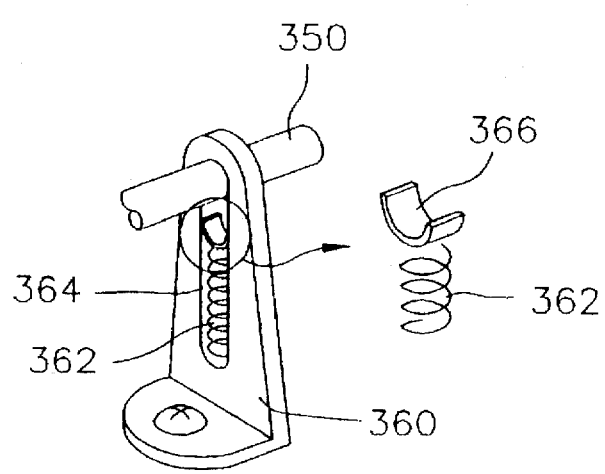
FIG. 5 is an enlarged perspective view of the bracket shown in FIG. 4.

FIG. 4 is a perspective view showing an embodiment of the container reverser section of FIG. 2, and FIG. 5 is an enlarged perspective view of the bracket shown in FIG. 4. As shown in FIGS. 4 and 5, pair of opposing brackets 360 are installed to be spaced apart from each other by a predetermined distance, and rotating rod 350 penetrates through brackets 360.

The free end of rotating rod 350 is bent to form second handle 352, and a disc 370 is fixed to an area between pair of brackets 360. Also, weight balancer 340 for facilitating the reversing motion is mounted to the other end of rotating rod 350, and a fourth spring under the constricted state is inserted around rotating rod 350 between weight balancer 340 and bracket 360.

One side of weight balancer 340 is closely attached to second wall 6, and a guide projection 344 of a predetermined size is formed to the center of rotation. A guide groove 342 having a width enough to be fitted with guide projection 344 is formed in a portion of second wall 6 closely attached to weight balancer 340 to be long to correspond to the depth of freezing container 320 by facing downward.

Disc 370 is connected with rotating rod 350 in the opposing radius direction, and a container mounting hole 372 is formed in the center thereof. Also, three hooks 310 are arranged to the upper portion of container mounting hole 372 at the regular interval. A hot wire 374 is internally installed to the interior of disc 370 and is externally connected.

Freezing container 320 is formed with ice 322 therein, can be inserted into container mounting hole 372, and is fixed by hooks 310 not to be separated.

Figure 7:
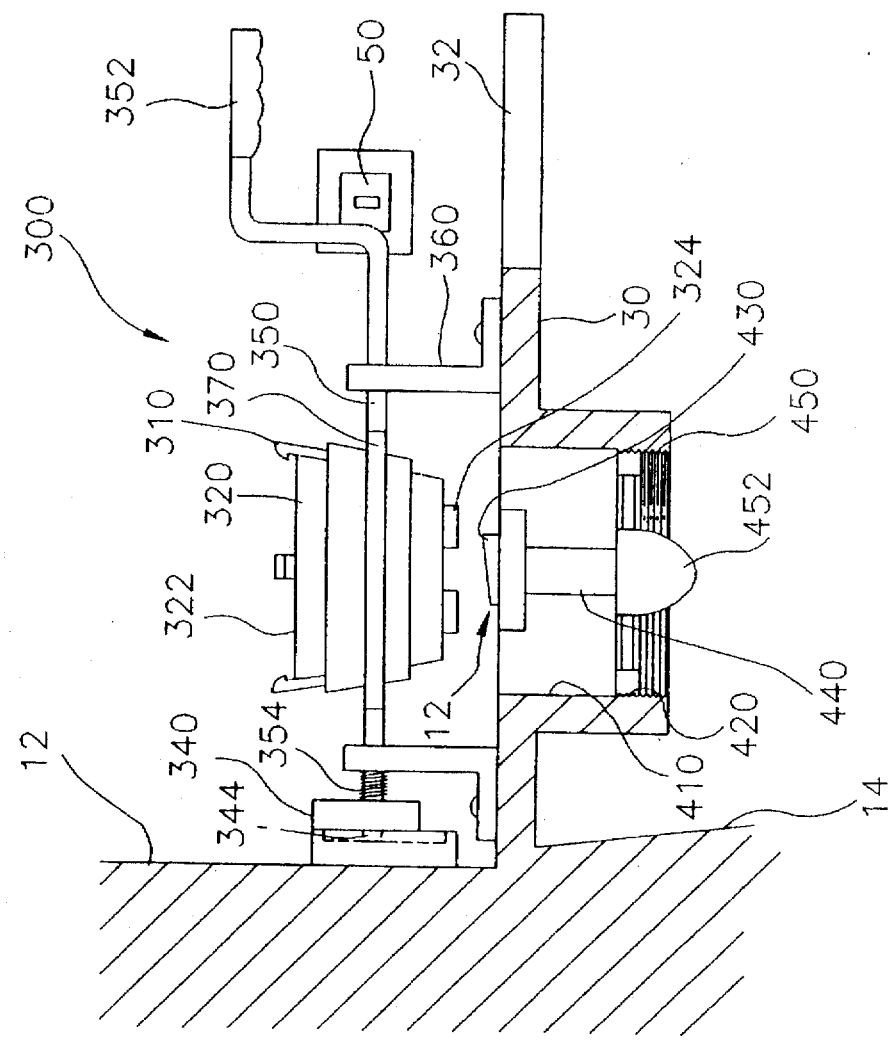
FIG. 7 is a side section view showing an installing state of the container reverser section and ice crash section provided with the freezing container in the initial status.

In FIG. 4, a reference numeral 410 denotes the thruhole, 430 is the cutter, and 440 is the center shaft, of which detailed description will be provided with reference to FIG. 7.

Bracket 360 has the lower portion fixed to support plate 30 by means of bolts, and the upper portion formed with a spring slit 364 for receiving rotating rod 350 therethrough. The width of spring slit 364 is formed to have dimension slightly larger than a diameter of rotating rod 350 for permitting rotating rod 350 to freely rotate and be transferred up and down, and to be longer than the depth of freezing container 320 in the downward direction.

A journal 366 which is a bearing for supporting the motion of rotating rod 350 within spring slit 364 has a semi-cylindrical shape. Second spring 362 supports journal 366 to closely attach it to rotating rod 350 at the lower side of journal 366.

Figure 6:
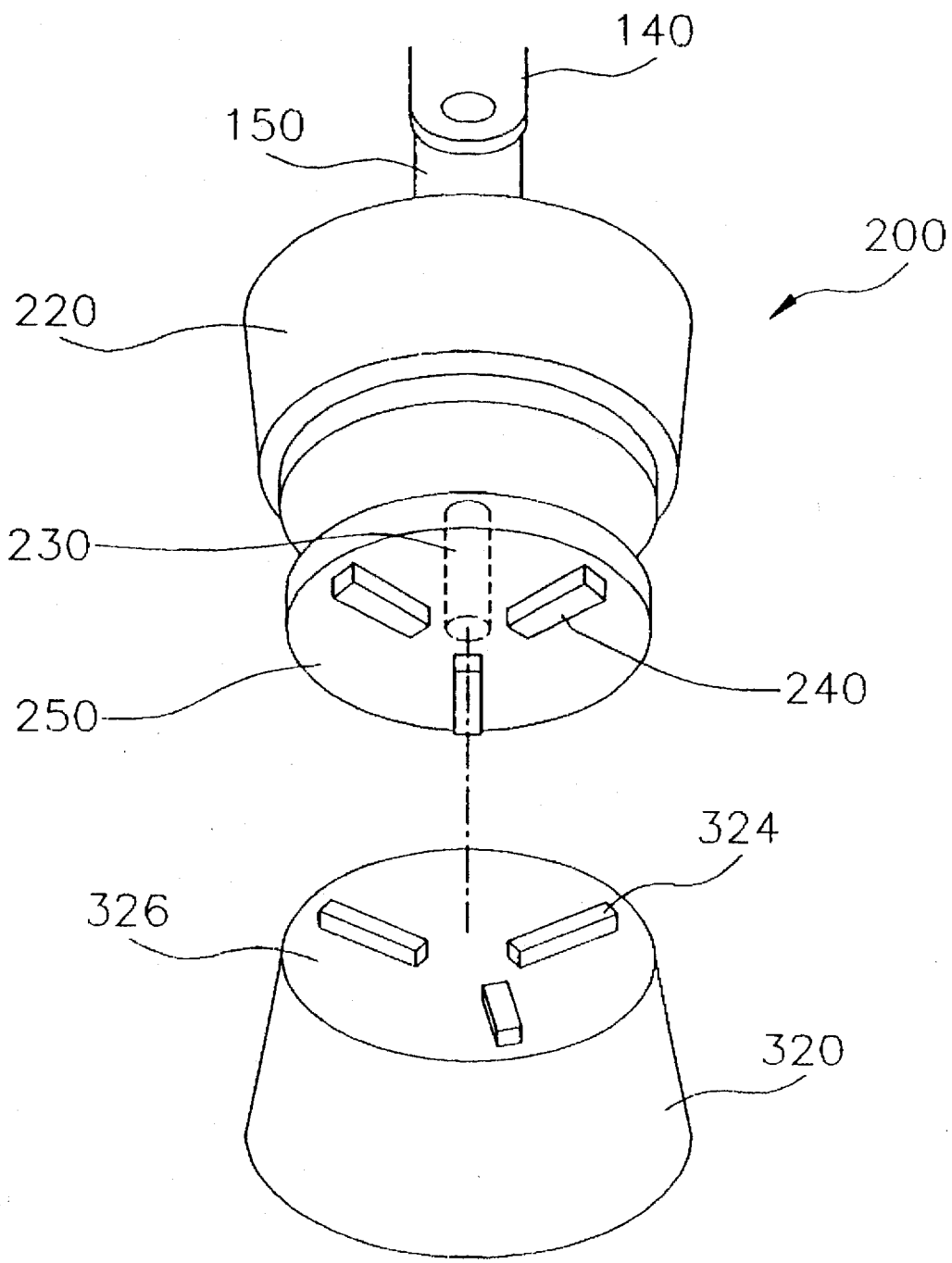
FIG. 6 is an enlarged perspective view of the clutch shown in FIG. 2.

FIG. 6 is an enlarged perspective view of the clutch shown in FIG. 2. As shown in FIG. 6, clutch 200 has a first clutch disc 250 and a second clutch disc 326.

Driving shaft 230 of motor 220 is coupled to one side of first clutch disc 250, and first projections 240 are formed to the opposite side thereof. First projections 240 are formed to be long in the radius direction and the three projections provide the regular interval in the circumferential direction.

Second clutch disc 326 is formed to the lower plane of freezing container 320 to face toward first clutch disc 250 as shown in FIG. 6 when freezing container 320 is reversed to face downward. Second clutch disc 326 is provided with second projections 324 identically shaped as first projections 240.

Figure 8:
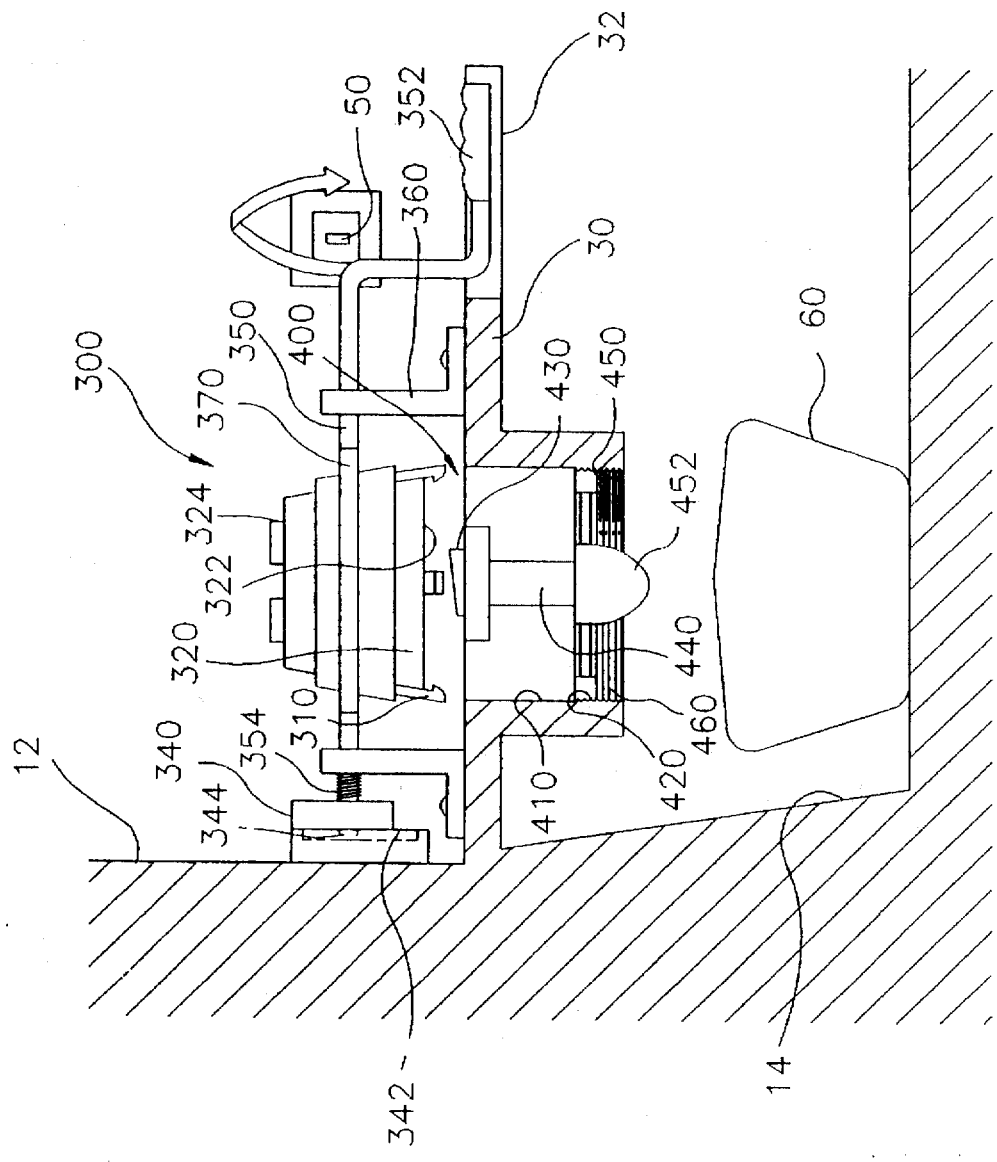
FIG. 8 is a side section view showing a state that the freezing container shown in FIG. 7 is placed in the reverse state.

FIG. 7 is a side section view showing an installing state of the container reverser section and ice crush section provided with the freezing container in the initial status, and FIG. 8 is a side section view showing a state that the freezing container shown in FIG. 7 is placed in the reverse state.

Container reverser section 300 installed into upper storage space 12 has been described in detail with reference to FIG. 6, and thus a description with respect to ice crush section 400 installed into lower storage space 14 will be provided in detail.

Thruhole 410 is formed in the center of support plate 30, and female screw 420 is provided along the interior of thruhole 410. Also, partially-cutaway plate groove 32 is formed in the outer side of support plate 30. Female screw 420 is brought into meshing engagement with male screw 460 formed along the outer periphery of circular exit disc 450. Center shaft 440 is positioned in the center of exit disc 450, and three arms 456 are connected between exit disc 450 and center shaft 440. Cutter 430 for crushing the ice is installed to the upper portion of center shaft 440.

An adjustment flake 452 is formed to the lower end of center shaft 440 to rotate exit disc 540 when the height of cutter 430 is to be adjusted, thereby adjusting the up and down position thereof.

Figure 9:
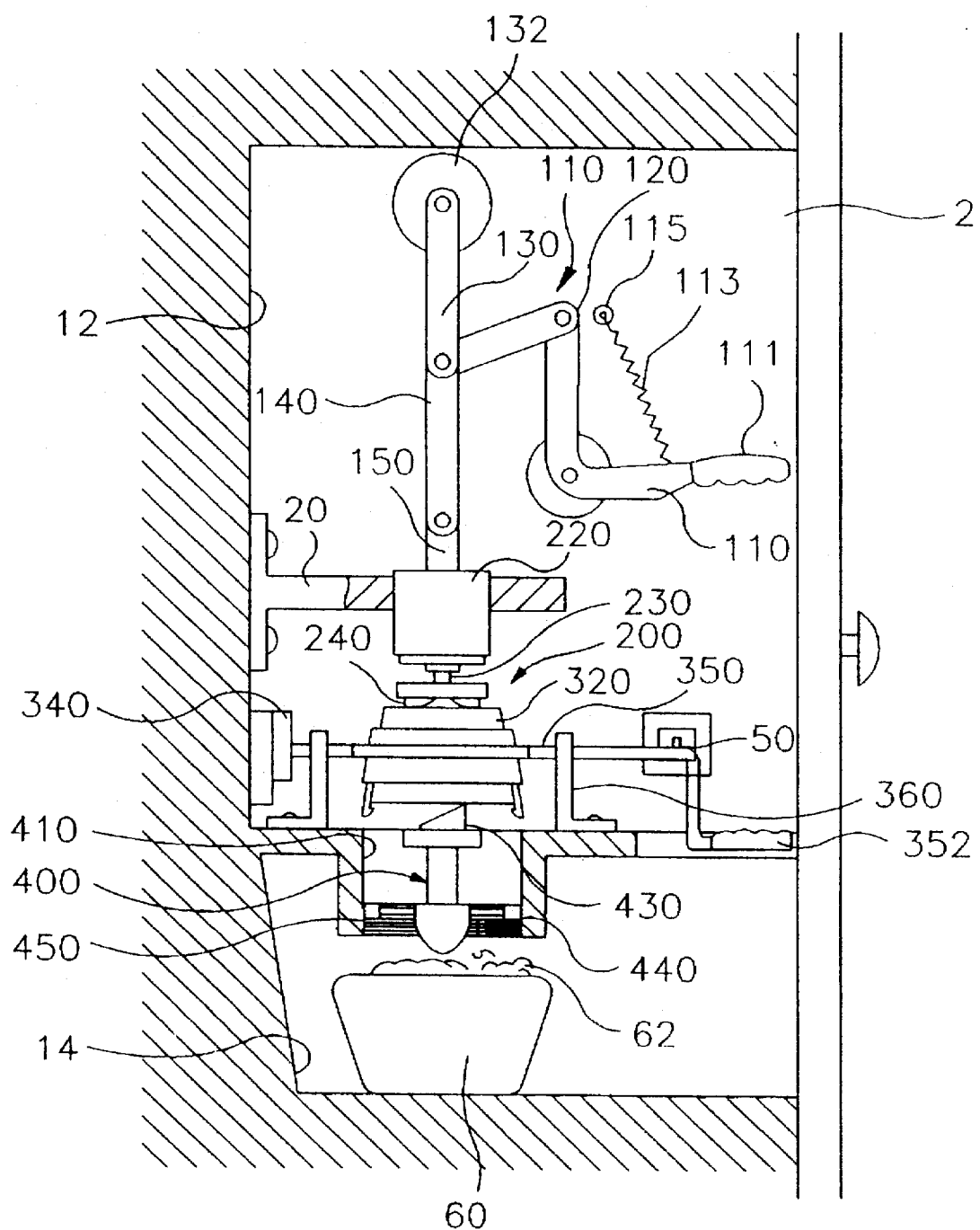
FIG. 9 is a side section view showing an operational status of the present invention.
Figure 10:
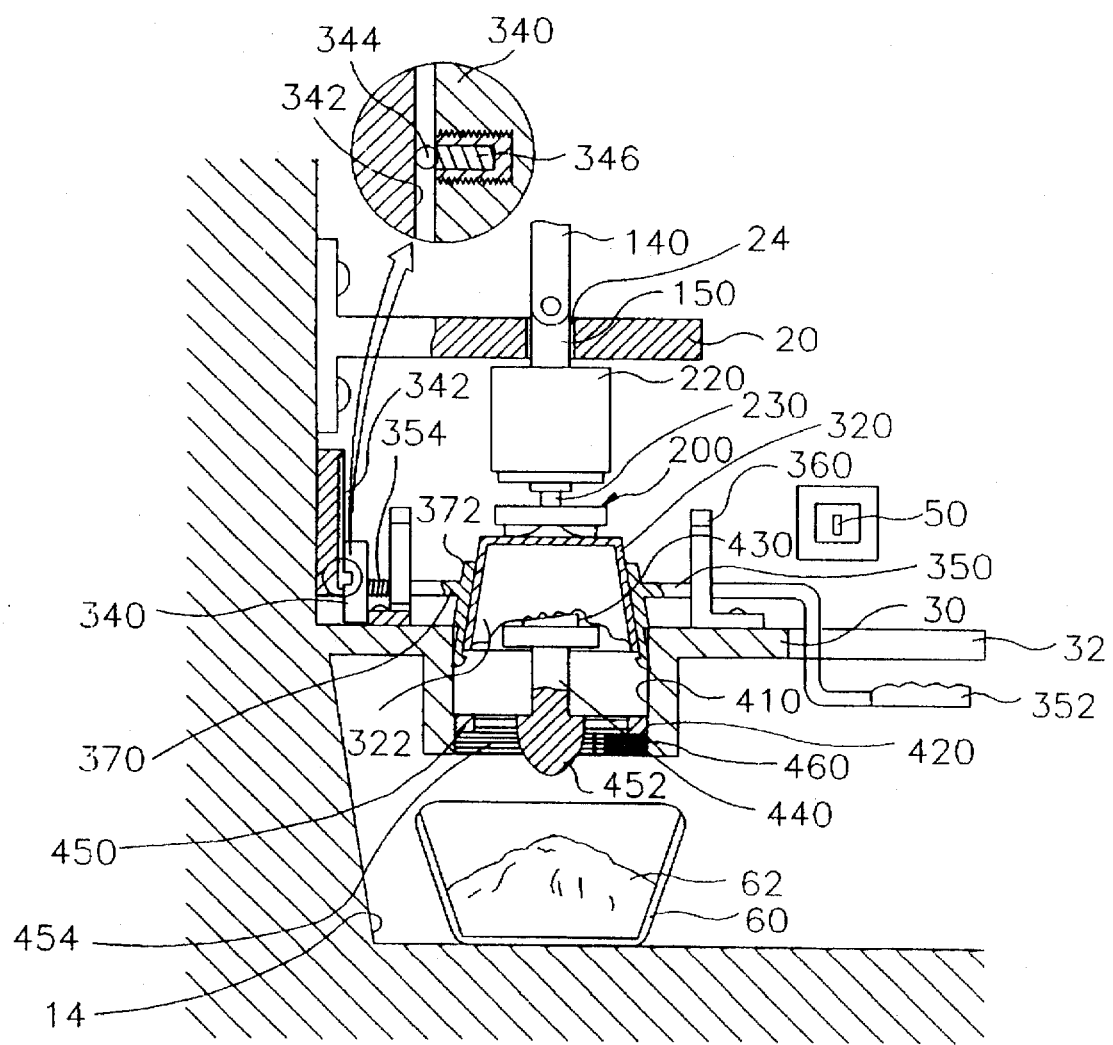
FIG. 10 is an enlarged view showing an operational status around the freezing container in FIG. 9.

FIG. 9 is a side section view showing an operational status of the present invention, and FIG. 10 is an enlarged view showing an operational status around the freezing container in FIG. 9. Especially, an enlarged section view of guide projection portion is illustrated within the circle designated in FIG. 10.

Guide projection 344 is disposed onto the center of weight balancer 340, and third spring 346 internally installed within weight balancer 340 supports guide projection 344 in the axial line direction.

The refrigerator having the ice crush apparatus according to the present invention constructed as above is operated and effected as below.

To begin with, freezing container 320 is filled with water to be inserted into container mounting hole 372 of disc 370 in the initial state. At this time, it should be suitably fixed by means of hooks 310. While maintaining the above-mentioned state, the water becomes frozen.

If the frozen ice is crushed to prepare the shaved ice with sugar syrup, as shown in FIG. 9, second handle 352 is rotated by as many as 180° in the direction of an arrow. Once hot wire switch 50 is operated by the rotating second handle 352, hot wire 374 generates heat for a predetermined time to melt the ice between freezing container 320 and container mounting hole 372 to facilitate the rotation of freezing container 320. At this time, freezing container 320 and disc 370 maintain the reversing state.

After this, operating switch 70 is operated to rotate motor 220 under the state that freezing container 320 and disc 370 are reversed. While motor 220 is being rotated, first handle 111 is to slowly swing in the direction of the arrow (i.e., clockwise direction) as shown in FIG. 9. Then, first spring 113 becomes stretched to move the connecting point of second link 140 and third link 130 to the right. By doing so, motor 220 connected with first link 150 is moved perpendicularly downward along guide hole 24.

Along with the descending of motor 220 while being rotated, first clutch disc 250 of clutch 200 connected to driving shaft 230 descends together while being rotated. While first clutch disc 250 is closely attached to second clutch disc 326 of reversed freezing container 320, first projections 240 and second projections 324 are brought into meshing engagement one another to be integrally rotated. Accordingly, freezing container 320 is also rotated within container mounting hole 372.

When first handle 111 is to continuously swing in the clockwise direction, freezing container 320 is liable to be separated from container mounting hole 372 while it descend. For this reason, a user also descends second handle 352, preferably.

Rotating rod 350 descends along spring slit 364 while constricting second spring 362 by the descending second handle 352. At this time, other end of rotating rod 350 is guided by guide projection 344 descending along guide groove 342 without involving side to side drift. Second handle 352 passes through plate hole 32 when descending.

Continuously descending freezing container 320 rims against cutter 430, and the crushing of ice 322 by cutter 430 is started by this time. The state that ice 322 is crushed by cutter 430 is illustrated in FIG. 10. Ice 322 within freezing container 320 transferred by first handle 111 while being rotated by motor 220 becomes crushed from the surface by fixed cutter 430. The crushed ice, i.e., shaved ice 62, is dropped downward to be retained into ice bowl 60 via ice discharging hole 454.

Here, in order to evenly crush ice 322 within freezing container 320, second handle 352 is to finely reciprocate in the forward and backward direction.

When ice 322 is fully crushed, operating switch 70 is off to stop the rotation of motor 220 and, at the same time, first handle 111 is to swing counter-clockwise to ascend motor 220. Thus, clutch 200 is separated by the ascending motor 220 and the rotation of freezing container 320 is stopped. If freezing container 320 is reversed again while second handle 352 ascends and is rotated, the initial state is secured again and the ice crushing process is finished.

When the height of cutter 430 is intended to be adjusted in accordance with the depth of freezing container 320 or quantity of ice 322, adjustment flake 452 is rotated to transfer exit disc 450 up and down within thruhole 410.

As a result, in the refrigerator having the ice crush apparatus according to the present invention, the water is frozen to be crushed for preparing the shaved ice with sugar syrup simply and conveniently within the household refrigerator. Furthermore, the shaved ice with sugar syrup can be prepared without taking out or relocating the ice to have an effect for sanitary reason.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A refrigerator having an ice crush apparatus comprising:

a motor for producing a rotating force;

transfer means for transferring said motor in the axial direction;

a first clutch disc connected to a driving shaft of said motor;

a freezing container formed with a second clutch disc closely attached to said first clutch disc onto a bottom plane thereof;

container reverser means for reversing said freezing container for supporting the rotating motion of said freezing container in the axial line direction; and ice crush means for crushing ice within said reversed freezing container.

2. A refrigerator having an ice crush apparatus as claimed in claim 1, wherein said driving shaft of said motor is installed perpendicularly downward.

3. A refrigerator having an ice crush apparatus as claimed in claim 2, wherein said transfer means comprises:

a first link fixed to an upper plane of said motor;

a second link having one end connected to said first link;

a third link having one end connected to the other end of said second link and the other end connected to a first wall;

a fourth link having one end connected to a connecting portion of said second link and third link; and a fifth link having one end connected to the other end of said fourth link, a center portion connected to said first wall, and the other end forming a free end.

4. A refrigerator having an ice crush apparatus as claimed in claim 3, wherein said first to fifth links further comprises an elastic member having one end fixed to said first fixing wall and the other end connected to at least one link among said first to fifth links.

5. A refrigerator having an ice crush apparatus as claimed in claim 4, wherein said elastic member is comprised of a first spring having one end connected to said first wall and the other end connected to said fifth link.

6. A refrigerator having an ice crush apparatus as claimed in claim 1, wherein said first clutch disc is formed with first projections onto an opposite plane of the plane connected with said driving shaft.

7. A refrigerator having an ice crush apparatus as claimed in claim 6, wherein said first projections are formed to number three.

8. A refrigerator having an ice crush apparatus as claimed in claim 7, wherein said first projections are formed to be long in the radius direction and are regularly spaced from one another in the circumferential direction.

9. A refrigerator having an ice crush apparatus as claimed in claim 1, wherein said second clutch disc of said freezing container is formed with second projections.

10. A refrigerator having an ice crush apparatus as claimed in claim 9, wherein said second projections are formed to number three.

11. A refrigerator having an ice crush apparatus as claimed in claim 10, wherein said second projections are formed to be long in the radius direction and regularly spaced from one another in the circumferential direction.

12. A refrigerator having an ice crush apparatus as claimed in claim 1, wherein said container reverser means comprises:

a disc formed with a container mounting hole in the center thereof for being inserted with said freezing container;

a rotating rod having both ends fixed into the opposite radius direction to each other at the outer periphery of said disc for reversing said disc; and supporting means for supporting the rotating motion and perpendicular transferring of said rotating rod.

13. A refrigerator having an ice crush apparatus as claimed in claim 12, wherein said disc further comprises a hot wire internally.

14. A refrigerator having an ice crush apparatus as claimed in claim 12, wherein said disc further comprises hooks formed around said container mounting hole of said disc for fixing said freezing container.

15. A refrigerator having an ice crush apparatus as claimed in claim 14, wherein said hooks number three at the regular interval around said container mounting hole.

16. A refrigerator having an ice crush apparatus as claimed in claim 12, wherein one end of said rotating rod is bent.

17. A refrigerator having an ice crush apparatus as claimed in claim 12, wherein said supporting means comprises:

at least one pair of brackets for receiving said rotating rod pierced therethrough and formed with a spring slit of a predetermined length in the perpendicular direction;

a journal installed to the interior of said spring slit for supporting said rotating rod;

a second spring installed into said interior of said spring slit for elastically supporting said journal; and guide means for guiding the perpendicular transferring of said rotating rod.

18. A refrigerator having an ice crush apparatus as claimed in claim 17, further comprising a weight balancer onto the other end of said rotating rod for facilitating the reversing motion of said freezing container.

19. A refrigerator having an ice crush apparatus as claimed in claim 18, wherein said guide means comprises:

a guide projection formed to the rotation center portion of said weight balancer;

a third spring installed into the interior of said weight balancer for elastically supporting said guide projection toward outside;

a second wall inserted with a portion of said guide projection and formed with a guide groove having a predetermined length in the perpendicular direction; and a fourth spring installed around said rotating rod passing a portion between said bracket and weight balancer for elastically and closely attaching said weight balancer to said second wall.

20. A refrigerator having an ice crush apparatus as claimed in claim 1, wherein said ice crush means comprises:

a cutter formed toward the interior of the reversed freezing container;

a center shaft installed to the lower portion of said cutter for fixing said cutter;

an exit disc for supporting said center shaft by means of at least one arm and formed with a male screw along the outer periphery thereof; and a support plate formed with a female screw coupled with said male screw.

21. A refrigerator having an ice crush apparatus as claimed in claim 20, wherein said arm of said exit disc numbers three.

22. A refrigerator having an ice crush apparatus comprising:

a motor installed with a driving shaft perpendicularly downward for producing a rotating force;

a first link fixed to an upper plane of said motor;

a second link having one end connected to said first link;

a third link having one end connected to the other end of said second link and the other end connected to a first wall;

a fourth link having one end connected to a connecting portion of said second link and third link;

a fifth link having one end connected to the other end of said fourth link, a center portion connected to said first wall, and the other end forming a free end;

a first spring having one end connected to said first wall and the other end connected to said fifth link;

a first clutch disc having a plane connected to said driving shaft, and an opposite plane installed with first projections numbering three formed to be long in the radius direction at the regular interval in the circumferential direction;

a freezing container having a bottom plane formed with a second clutch disc closely attached to said first clutch disc onto thereof, said second clutch disc provided with second projections numbering three formed to be long in the radius direction at the regular interval in the circumferential direction;

a disc formed with a container mounting hole in the center thereof for being inserted with said freezing container, a hot wire therein, and hooks numbering three for fixing said freezing container around said container mounting hole at the regular interval;

a rotating rod having both ends fixed into the opposite radius direction to each other at the outer periphery of said disc for reversing said disc, the one end being bent and the other end being installed with a weight balancer;

a pair of brackets for receiving said rotating rod pierced therethrough and formed with a spring slit of a predetermined length in the perpendicular direction;

a journal installed to the interior of said spring slit for supporting said rotating rod;

a second spring installed into said interior of said spring slit for elastically supporting said journal;

a guide projection formed to the rotation center portion of said weight balancer;

a third spring installed into the interior of said weight balancer for elastically supporting said guide projection toward outside;

a second wall inserted with a portion of said guide projection and formed with a guide groove having a predetermined length in the perpendicular direction;

a fourth spring installed around said rotating rod passing a portion between said bracket and weight balancer for elastically and closely attaching said weight balancer to said second wall;

a cutter formed toward the interior of the reversed freezing container;

a center shaft installed to the lower portion of said cutter for fixing said cutter;

an exit disc for supporting said center shaft by means of three arms and formed with a male screw along the outer periphery thereof; and a support plate formed with a female screw coupled with said male screw.

* * * * *